Feb. 4, 1964 R. W. WALLER ETAL 3,120,656

CODING MECHANISM

Filed Nov. 4, 1959 2 Sheets-Sheet 1

INVENTORS
ROBERT W. WALLER
GEORGE W. COX
BY
Joseph Weingarten
ATTORNEY

CODING MECHANISM

Filed Nov. 4, 1959 2 Sheets-Sheet 2

INVENTORS
ROBERT W. WALLER
GEORGE W. COX
BY
Ralph Weingarten
ATTORNEY

United States Patent Office 3,120,656

Patented Feb. 4, 1964

3,120,656

CODING MECHANISM

Robert Wyman Waller, Sherman Oaks, and George W. Cox, Los Angeles, Calif., assignors to Computer Control Company, Inc., Framingham, Mass., a corporation of Delaware Filed Nov. 4, 1959, Ser. No. 850,959
3 Claims. (Cl. 340—347)

This invention relates in general to codifying apparatus and more particularly pertains to a mechanical structure having movable code bars and multiple keys arranged so that upon a key being depressed, one or more of the code bars is displaced or remains undisplaced in accordance with a definite pattern that is unique to the depressed key.

The coding mechanism of this invention is a device for converting information in a numeric system to binary coded information. The invention is especially useful for inserting numerical information into digital computers in the electrical form for which that computer is designed. In some conventional computers, the insertion of information is ordinarily accomplished by an operator at a keyboard which resembles that of an adding machine. By depressing any key representative of a number, an electrical code is generated characteristic of that number in the system of notation employed by the computer. Because many notational systems are currently in use, to insert numerical information into a digital computer, it may be necessary to convert octal or decimal information to binary coded information. The binary coded information itself may be arranged to conform with the standard binary system, the Grey binary system, the standard binary coded decimal system, the Grey binary coded decimal system, and other types of binary systems.

In converting from the octal numeric system to the binary system, the on-off conditions of three switches are used to encode eight possibilities, i.e., the digits 0 through 7. In converting from the decimal system to the binary system, the on-off conditions of four switches are used to encode 10 possibilities, that is, the digits 0 to 9 inclusive. The coding mechanism of the invention is provided with a row of keys, each key representing a different character in a numeric system. Assuming a decimal system, the row would contain ten keys, each of the keys representing a different decimal numeral. A plurality of code bars are disposed beneath the keys. Each code bar is so constructed that a ramp or inclined surface is positioned under certain keys in the row such that when one of those keys is depressed, the stem of the key contacts the inclined plane and causes the code bar to move in a prescribed direction. The inclined planes of the several code bars are arranged so that when a key, representing a decimal number, is depressed the code bars are caused to move in directions such that each of the switches is placed in an "on" or an "off" condition. The electrical pattern formed by the four switches then provides a binary code unique to that decimal numeral.

Figure 1:
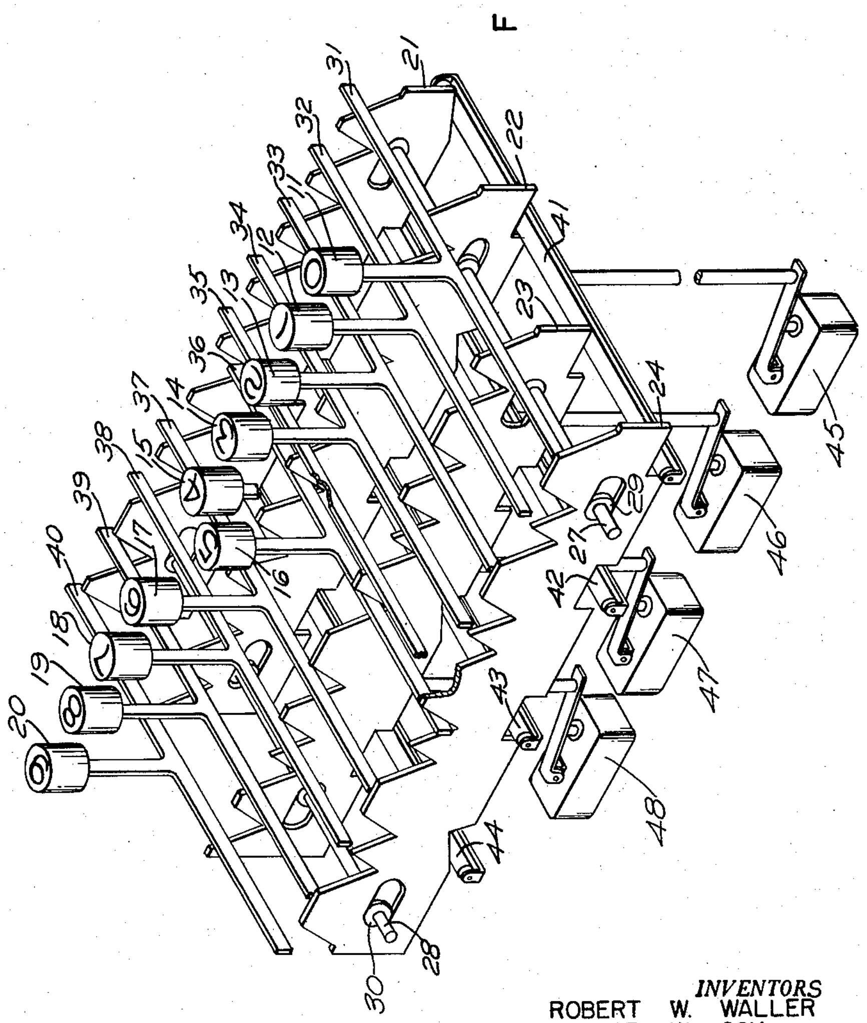
Figure 2:
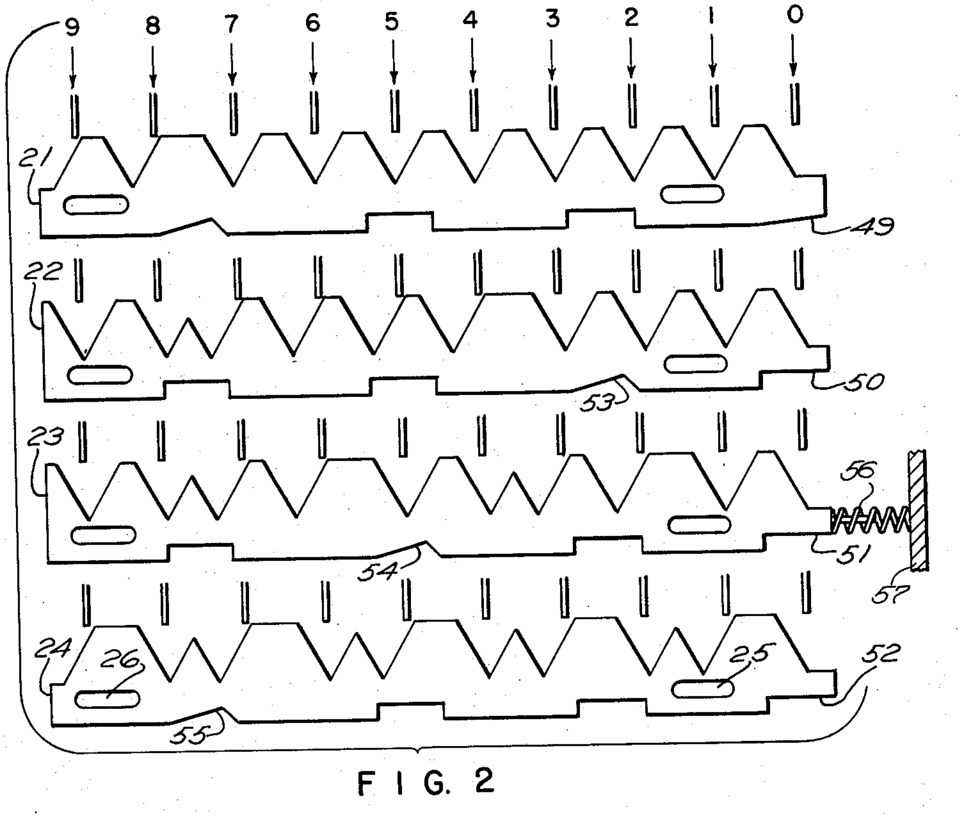
Figure 3:
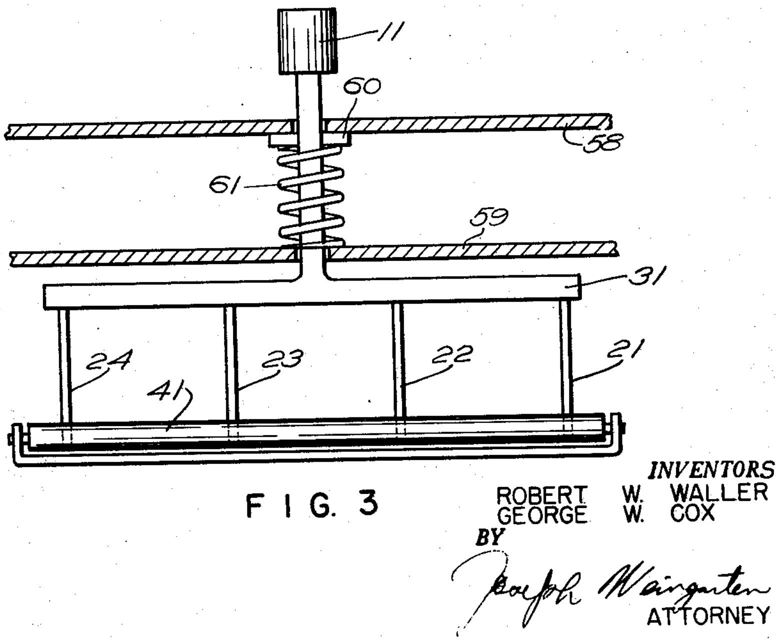

The organization of the invention and its mode of operation can be apprehended from the following detailed description when considered in conjunction with the accompanying drawings in which:

FIG. 1 depicts a preferred embodiment of the invention arranged to convert decimal information to binary coded information; and FIG. 2 illustrates the profile of the code bars and indicates the relative position between the key stems and the notches in the code bars when the code bars are in their normal positions; and FIG. 3 shows an arrangement for resiliently supporting a key.

Referring now to FIG. 1, which depicts an assemblage arranged in accordance with the invention, there is shown a plurality of keys 11 through 20 aligned in a row, each of those keys representing a different one of the decimal digits 0, 1, . . . 9, and the keys being arranged to form a consecutive series from 0 to 9. Disposed below the keys are a number of code bars 21, 22, 23, and 24, the profile of those bars being shown in FIG. 2. Each of those members, the bar 24 for example, is provided with a pair of elongated slots 25 and 26. The code bars are supported, as shown in FIG. 1, by a pair of spaced rods 27 and 28 extending through the elongated slots. It will be understood that the bars 27 and 28 are suitably supported by means not shown. The code bars are, in effect, suspended upon those rods in a manner permitting the code bars to move forwardly and backwardly along their longitudinal axes. If desired, bushings 29, 30 fabricated of nylon or some other suitable material, may be provided on the rods 27 and 28 to reduce friction. The stems of the keys 0 through 9 are terminated by dependent transoms 31 through 40, each of those transoms extending across the four code bars 21 to 24. The upper surfaces of the code bars 21, 22, 23, and 24 are provided with V-shaped notches as indicated by the profiles of those code bars in FIG. 2. With the code bars in their normal position, that is, with none of the keys depressed, the positions of the transoms 31 to 40 in relation to the V-shaped notches in the code bars are as shown in FIG. 2.

Located beneath the code bars 21 to 24 are four switch actuators 41, 42, 43, and 44, each switch actuator being constituted by a rod journaled in a yoke and a stem extending downwardly from the yoke. Each of the actuators has its stem resting upon a different one of the switches 45, 46, 47, and 48 so that when an actuator is moved downwardly it operated the associated switch, opening that switch if it is closed or closing that switch if it is open. Code bars 21 is provided with a ramp 49 in its lower edge and the actuator 41 is so disposed that when the code bar 21 is moved forwardly, i.e., towards the right, the ramp 49 causes the actuator 41 to be pushed downwardly and operate the switch 45. The other code bars 22, 23, and 24 are provided with cutouts 50, 51, and 52 so that those code bars, when moved forward, would merely pass over the actuator 41 without depressing that member. Thus, the switch 45 is controlled solely by the position of code bar 21. In a similar manner, code bar 22 is provided with a ramp 53 which co-operates with the actuator 42 to control the switch 46, the code bar 23 is provided with a ramp 54 which co-operates with the actuator 43 to control the switch 47, and code bar 24 is provided with a ramp 55 which co-operates with the actuator 44 to control the switch 48.

Referring now to FIG. 2, which shows the relative positions between the transoms of the keys representing the numbers 0, 1, 2 . . . 9 and the notches in the code bars, and more specifically to the profile of code bar 24, it can be seen that when any of the keys representing the numerals 1, 3, 5, 7, and 9 is depressed, the transom associated with the depressed key will move downwardly and cause the code bar 24 to move forwardly (toward the right as indicated by the arrow in FIG. 2) thereby causing actuator 44 to be moved downwardly by the ramp 55 so that the switch 48 is actuated. Where any one of the keys representing the digits 0, 2, 4, 6, and 8 is depressed, the associated transom moves downwardly into the apex of the V and locks the code bar 24 so that it cannot be moved out of its "normal" position. Where code bar 24 is in its forward position and any one of the keys representing numerals 2, 4, 6, or 8 is depressed, the transom associated with the depressed key bears an inclined surface of the V notch causing the code bar to move back to its "normal" position and to be there locked. The profile of code bar 23 is so formed that pressing any of the keys representing numerals 2, 3, 6, and 7 causes that code bar to move forwardly and operate the switch 47. Depressing any of keys 0, 1, 4, 5, 8, and 9 causes the transom associated with the depressed key to move downwardly into the apex of the V notch and lock the code bar in its normal position. The profile of code bar 22 is formed so that operation of keys representing numerals 0, 1, 2, 3, 8, and 9 cause that bar to be locked in its normal position whereas operation of any one of keys 4, 5, 6, and 7 causes that code bar to be moved toward the right so that the actuator 42 is pressed downwardly by the ramp 53, actuating switch 46. The profile of code bar 21 is arranged to cause that code bar to be moved forwardly upon depression of either of the keys representing numerals 8 or 9 and to be locked in the normal position when any one of the keys 0 to 7 is depressed. Forward movement of code bar 21 causes ramp 49 to press actuator 41 downwardly and alter the condition of switch 45.

The coding system of FIG. 1 converts the decimal digits 0, 1, 2 . . . 9 into their equivalent coded binary numbers. Assuming for expository purposes that conversion is to be made into the standard binary coded decimal system, the equivalent binary code of the decimal digits accord with the following table:

| Decimal | Binary | | | |
|---|---|---|---|---|
| | Sw. 45 | Sw. 46 | Sw. 47 | Sw. 48 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

It will be noted from the table that each decimal digit 0 to 9 has a corresponding binary code comprised of four "bits." Each of the four switches 45, 46, 47, and 48 provides a different bit of the four bit binary code. The "0" of the binary code may be represented by either the opened or closed position of a switch and the "1" of the binary code is then necessarily represented by the other condition of the switch. Assuming that the open condition of the switch represents a "0" and that the switches 45 to 48 are open when the code bars are in the normal position, depressing any key in the row causes the code bars to assume positions such that the proper binary code is produced by the switches 45 to 48. For example, if the key representing the decimal digit 5 is depressed as indicated in FIG. 1, the transom 36 of that key, in moving downwardly, locks the code bars 21 and 23 in their normal positions and causes the code bars 22 and 24 to move forwardly. In the forward positions of code bars 22 and 24, the ramps 53 and 55 press upon actuators 44 and 42, closing the switches 48 and 46. Therefore, with the "5" key depressed, the position of the code bars are such that switches 45 and 47 are open and switches 46 and 48 are closed. Reading those switches from right to left in FIG. 1, the binary code represented by those switches is 0101 and from the above table it can be seen that binary code combination is a conversion of the decimal numeral 5. If the key representing the decimal numeral 9 is now depressed, code bars 22 and 23 are locked in their normal positions by the transom 40 which moves downward into the apex of the slots and code bars 21 and 24 are thrust forward causing the actuators 44 and 41 to close the switches 48 and 45. The condition of the switches from 48 to 45, read from right to left in FIG. 1, is 1001 and it may be seen from the above table that the code 1001 represents decimal numeral 9.

The mechanism inherently prevents errors caused by the inadvertent or deliberate striking of two keys concurrently. The arrangement of the notches in the code bars and the positioning of the code bars relative to one another, prevent the simultaneous depression of two or more keys. For example, where the keys representing decimal digits 1 and 2 are simultaneously struck, the "1" key attempts to lock code bars 21, 22, and 23 in their normal positions and to move code bar 24 forward, while the "2" key simultaneously attempts to lock code bars 21, 22, and 24 in their normal positions and move code bar 23 forward. The result is that neither the "1" nor the "2" can be fully depressed and the partial forward movement of code bars 23 and 24 is not sufficient to actuate the switches 48 or 47 so that no binary code is generated.

In order to aid the code bars in returning to their "normal" positions a spring, such as the spring 56 shown in FIG. 2, may be interposed between a stationary member 57 and one end of the code bar. Thus the spring 56 constantly exerts a force tending to return code bar 23 to its normal position. Return springs are not essential to the invention as the arrangement of notches in the code bars are such as to cause the appropriate code bars to be moved back to their normal position when any key is depressed.

It is apparent that keys 0 through 9 must be supported in their raised positions and FIG. 3 depicts a suitable arrangement which may be utilized for this purpose. The stem of the key passes through aligned apertures in an upper plate 58 and a lower plate 59. A rigid disc 60 is secured to the stem and a helical spring 61 is disposed around the stem so as to provide an expansive force between the underside of disc 60 and the upper surface of lower plate 58. The key, thus, is maintained in its raised position by spring 61. The upper surface of disc 60 may be covered with a shock absorbing and sound deadening material such as felt or rubber.

The coding mechanism here disclosed may be combined with commercially available devices whose function is to lock a key in its depressed position until a clearing key is actuated to release the depressed key. Such locking mechanisms form no part of this invention.

While a preferred embodiment of the invention is illustrated in the drawings and has been described herein, modifications which do not depart from the essence of the invention may be made and, indeed, are apparent. In view of the obvious modifications which may be made, it is intended that the invention not be limited by the precise structure which is illustrated, but rather that the scope of the invention be construed in accordance with the appended claims.

What is claimed is:

1. A coding device comprising a plurality of code bars, means supporting said code bars to permit reciprocatory motion, each of said code bars having notches therein providing inclined surfaces, a larger plurality of keys, each of said keys representing a different value in a numeric system, each of said keys having a stem extending across said code bars, each of said keys upon being actuated causing its stem to move into a notch in each of said code bars, said code bars being disposed relative to one another and the notches being arranged so that certain of said code bars are locked in a first position by said stem and at least one of said code bars is moved into a second position by said stem bearing upon an inclined surface, whereby said code bars form a positional pattern unique to the depressed key.

2. A code translator for converting values in a first numeric system into binary code, said code translator comprising, a plurality of keys each representative of a different value in said first numeric system, a lesser plurality of electrical switches whose output form a pattern representative of values in said binary code, a plurality of code bars, means supporting said code bars for reciprocatory motion, each of said code bars being adapted when displaced in a predetermined direction to actuate a different one of said switches, each of said code bars having notches therein providing inclined surfaces, each of said keys having an associated transom extending across said plurality of code bars, and the notched surfaces of said code bars being arranged relative to the transoms of said keys whereby in response to the activation of one of said keys the associated transom is moved into a notch in each code bar to cause at least one of said code bars to be displaced in the direction to actuate its associated switch and the other code bars to be locked in their switch-deactuated positions.

3. A code translator for converting values in a first numeric system into binary code, said code translator comprising, a plurality of keys each representative of a different value in said first numeric system, a lesser plurality of electrical switches whose output form a pattern representative of values in said binary code, a plurality of code bars, means supporting said code bars for reciprocatory motion, each of said code bars being adapted when displaced in a predetermined direction to actuate a different one of said switches, each of said code bars having V-shaped notches therein providing inclined surfaces, each of said keys having an associated transom extending across said plurality of code bars, and the transom of said keys being arranged relative to the V-notch inclined surfaces of said code bars whereby in response to the actuation of one of said keys the associated transom is moved toward the apex of a V-notch in each code bar causing each said code bar to be displaced to actuate its associated switch or to be locked in switch deactivated position to cause the outputs of said switches to form a binary code corresponding to the numeric value of the actuated key.

References Cited in the file of this patent

UNITED STATES PATENTS

| | | |
|---|---|---|
| 1,960,438 | Griffith | May 29, 1934 |
| 2,174,596 | Potts | Oct. 3, 1939 |
| 2,903,687 | Baer et al. | Sept. 8, 1959 |